United States Patent
Bek et al.

(10) Patent No.: US 10,982,740 B2
(45) Date of Patent: Apr. 20, 2021

(54) OSCILLATION DRIVE WITH ADJUSTABLE OSCILLATION ANGLE

(71) Applicant: C. & E. Fein GmbH, Schwaebisch Gmuend-Bargau (DE)

(72) Inventors: Fabian Bek, Boebingen (DE); Walter Thomaschewski, Filderstadt (DE); Christoph Wohlfrom, Heubach (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 177 days.

(21) Appl. No.: 16/168,141

(22) Filed: Oct. 23, 2018

(65) Prior Publication Data

US 2019/0120347 A1  Apr. 25, 2019

(30) Foreign Application Priority Data

Oct. 23, 2017 (DE) .................. 10 2017 124 745.9

(51) Int. Cl.
| | |
|---|---|
| *F16H 25/16* | (2006.01) |
| *B24B 27/08* | (2006.01) |
| *B27B 19/00* | (2006.01) |
| *B23D 51/16* | (2006.01) |
| *H02K 7/00* | (2006.01) |

(Continued)

(52) U.S. Cl.
CPC ............ *F16H 25/16* (2013.01); *B23D 51/16* (2013.01); *B24B 27/08* (2013.01); *B25F 3/00* (2013.01); *B27B 19/006* (2013.01); *H02K 7/003* (2013.01); *H02K 7/075* (2013.01); *B23D 61/006* (2013.01); *B24B 23/04* (2013.01); *B24B 47/16* (2013.01); *B24B 49/00* (2013.01)

(58) Field of Classification Search
CPC ....... F16H 25/16; B23D 61/006; B24B 23/04; B27B 19/006; H02K 7/075
See application file for complete search history.

(56) References Cited

U.S. PATENT DOCUMENTS

| | | | |
|---|---|---|---|
| 7,530,881 B2 * | 5/2009 | Zhong | ............... B24B 23/04 451/11 |
| 9,670,998 B2 | 6/2017 | Sumi et al. | |

(Continued)

FOREIGN PATENT DOCUMENTS

| | | |
|---|---|---|
| DE | 10220325 A1 | 11/2003 |
| DE | 102014102130 A1 | 5/2015 |

(Continued)

*Primary Examiner* — Randell J Krug
(74) *Attorney, Agent, or Firm* — Muncy, Geissler, Olds & Lowe, P.C.

(57) ABSTRACT

An oscillation drive with a drive and with an eccentric coupling drive for converting a rotary motion of the drive into an oscillating rotary motion of a tool spindle about its longitudinal axis is disclosed, wherein the eccentric coupling drive has an eccentric with a first eccentricity that is driven by the drive and that works together with a coupling element that is coupled to the tool spindle in order to convert the motion of the eccentric into an oscillating rotary motion of the tool spindle, wherein the eccentric is coupled to an additional eccentric with a second eccentricity so that the eccentricities are superimposed, wherein the relative position between the eccentric and the additional eccentric is adjustable to at least two different positions in order to change the amplitude of the oscillating motions of the tool spindle.

21 Claims, 8 Drawing Sheets

(51) Int. Cl.
*H02K 7/075* (2006.01)
*B25F 3/00* (2006.01)
*B23D 61/00* (2006.01)
*B24B 23/04* (2006.01)
*B24B 47/16* (2006.01)
*B24B 49/00* (2012.01)

(56) References Cited

U.S. PATENT DOCUMENTS

| | | |
|---|---|---|
| 2012/0007748 A1 | 1/2012 | Forgues et al. |
| 2014/0068952 A1* | 3/2014 | Soreo ............... B24B 27/08 30/369 |
| 2016/0271711 A1 | 9/2016 | Qian et al. |

FOREIGN PATENT DOCUMENTS

| | | |
|---|---|---|
| EP | 2760612 A1 | 8/2014 |
| GB | 2420518 A | 5/2006 |
| WO | WO2015078386 A1 | 6/2015 |

* cited by examiner

OSCILLATION DRIVE WITH ADJUSTABLE OSCILLATION ANGLE

This nonprovisional application claims priority under 35 U.S.C. § 119(a) to German Patent Application No. 10 2017 124 745.9, which was filed in Germany on Oct. 23, 2017, and which is herein incorporated by reference.

BACKGROUND OF THE INVENTION

Field of the Invention

The present invention relates to an oscillation drive with a drive and with an eccentric coupling drive for converting a rotary motion of the drive into an oscillating rotary motion of a tool spindle about its longitudinal axis, wherein the eccentric coupling drive has an eccentric with a first eccentricity that is driven by the drive and that works together with a coupling element that is coupled to the tool spindle in order to convert the motion of the eccentric into an oscillating rotary motion of the tool spindle.

Description of the Background Art

An oscillation drive of this nature is known from DE 102 20 325, for example.

In this design, an eccentric journal is accommodated on the end of a motor shaft. Held on the eccentric journal is an eccentric bearing in the form of a needle roller bearing, which is held between the two fork ends of an oscillating fork by means of a crowned outer ring. The other end of the oscillating fork is connected in a rotationally fixed manner to the tool spindle.

An implementation of this type produces a fairly simple construction of the oscillation drive. Such oscillation drives have a variety of applications, such as in grinding, sawing, and also cutting of workpieces. Normal oscillation frequencies here are approximately in the range from 5,000 to 25,000 oscillations per minute. Typical maximum pivot angles of the tool spindle (also referred to as amplitude of the oscillation) are between approximately 0.5° and 7° (from dead center to dead center).

Oscillation drives designed in such a manner are highly flexible and are suitable for many possible applications, areas of use, and tools to be employed. Due to their compact and lightweight form, they allow the user to take on a wide variety of grip or operating positions with respect to the hand tool or the workpiece.

Because of the diversity of the tools that can be used, the oscillation angle that is produced by a specific oscillation drive is always associated with a certain compromise. Whereas oscillating tools that are used for, e.g., surface grinding, and thus have a relatively large triangular or round backing pad, should advantageously be driven with a relatively small oscillation angle in order to avoid overloading the drive, there are other tools that should advantageously be driven with a larger oscillation angle, for instance to permit rapid progress of the work. This comes into consideration especially for smaller tools that do not have large inertia. For other tasks, in contrast, for example to cut the adhesive bead of car windows during glazing removal, small oscillation angles are preferred in order to avoid self-destruction of the cutter blade in question.

SUMMARY OF THE INVENTION

It is therefore an object of the present invention to provide an oscillation drive that permits changing of the maximum oscillation angle, which is to say the amplitude between two dead centers.

This object is attained according to an exemplary embodiment of the invention with an oscillation drive in that an eccentric is coupled to an additional eccentric with a second eccentricity so that the eccentricities are superimposed, wherein the relative position between the eccentric and the additional eccentric is adjustable to at least two different positions.

Since the effects of the eccentric and the additional eccentric are superimposed, a resulting motion is produced that can be varied between extremes, namely between an additive superimposition in which the two eccentricities add together and a position in which a minimal amplitude is produced because the two eccentricities are superimposed subtractively.

In general, it is possible to design the relative position between the eccentric and the additional eccentric to be continuously variable. In this way, an amplitude of the oscillating motion is produced that is continuously adjustable within predefined limits.

The drive can be designed to be reversible in its direction of rotation in order to cause a switchover between a first relative position of the eccentric and the additional eccentric in which the two eccentricities are superimposed additively, and a second relative position in which the eccentricities of the eccentric and the additional eccentric are superimposed subtractively.

An especially simple design is produced in this way. By simply reversing the direction of rotation of the drive, two different amplitudes of the oscillating motion can be set. In this way, different pairings of oscillation angles can be achieved as a function of the layout of the eccentric and the additional eccentric.

For example, an embodiment can be a combination of an amplitude of 2.6° for subtractive superimposition and an amplitude of 5.0° for additive superimposition. In general, any other desired amplitude pairings are also possible within certain limits, however. Small amplitudes are advantageous for precise work as well as for cutter blades or very long or large tools. In contrast, large amplitudes make for rapid progress of work and result in less precise work. Some tools, and also some oscillation drives that result in very large acceleration forces while working, such as very large backing pads or long blades, are only suitable for smaller amplitudes.

The eccentric and the additional eccentric can be rotated by 180° relative to one another between the first and second relative positions.

In this way, the maximum difference between the additive superimposition of the eccentricities and the subtractive superimposition of the eccentricities can be achieved simply through the reversal of the direction of rotation.

The coupling element can be implemented as an oscillating fork, which is rigidly attached at a first end to the tool spindle and is driven at a second end by the additional eccentric.

This makes possible an especially simple design.

The additional eccentric can be rotatably mounted on the eccentric, and the second end of the oscillating fork encloses, from the outside, an eccentric bearing that is held on the additional eccentric.

The eccentric bearing can be implemented as a spindle bearing with a crowned outer ring that is enclosed by two fork ends of the oscillating fork.

An especially simple, reliable design results in this way.

The eccentric can have an eccentric stub that engages an eccentrically located recess of the additional eccentric, on whose outer surface the eccentric bearing is held.

The eccentric stub can be implemented at one end of an output shaft that is driven in rotation.

The drive can have an electric motor on whose motor shaft the eccentric stub is implemented.

An especially simple and reliable design is ensured by means of these features.

A sleeve, which can be coupled to the additional eccentric in at least two relative positions by means of a driver, can be arranged on the motor shaft in a rotationally fixed manner.

In this way, the relative position between the additional eccentric and the eccentric, which is mounted directly on the motor shaft, can be adjusted in a very simple manner.

The additional eccentric can have a disk that is rotatably arranged inside the sleeve and strikes against a lug of the sleeve in the at least two relative positions.

In this way, the switchover between the two relative positions through reversal of the direction of rotation of the motor shaft proves to be especially simple.

The disk can have an elastic section that expands outward under the action of centrifugal force and rests against an inside surface of the sleeve to fix the relative position between the eccentric and the additional eccentric.

The expansion of the elastic section under the action of centrifugal force ensures that the relative position between the eccentric and the additional eccentric, and hence the amplitude of the oscillation, can no longer change during operation.

The implementation described above permits especially simple switchover between the two amplitudes of the oscillation by reversal of the direction of rotation of the motor shaft. The additional eccentric initially remains stationary during reversal of the direction of rotation of the motor shaft, and is then carried along by the further rotation of the motor shaft as soon as the disk of the additional eccentric strikes against the lug of the sleeve. The additional eccentric remains stationary purely due to inertia.

The fact that the additional eccentric remains stationary due to inertia during reversal of the direction of rotation may result in undefined states in unfavorable cases, such as different amounts of grease filling. Hence, under unfavorable conditions a change in the amplitude of the oscillation angle may result that deviates from the desired change.

In order to avoid problems of this nature, the additional eccentric can additionally be stopped by a brake system before being carried along again during reversal of the direction of rotation.

To this end, a brake system is provided that permits braking of the additional eccentric in the stationary condition relative to the housing and that releases under the action of centrifugal force when the motor shaft is rotating in order to end the braking action.

In this way, it is ensured in all cases that the additional eccentric initially remains stationary and is not carried along until after the eccentric has moved by 180° relative thereto. In this way, a switchover of the relative position between the eccentric and the additional eccentric by the desired rotation of 180° each time relative to one another is guaranteed in every case, so that the switchover between the additive superimposition of the eccentricities and the subtractive superimposition of the eccentricities is produced precisely.

The sleeve can have a slide guide in the form of a recess, through which a driver pin in an associated driver receptacle on the additional eccentric engages, in order to define the relative position between the eccentric and the additional eccentric.

In this way, the driving between the eccentric and the additional eccentric is made possible in a simple manner.

The brake system can have two spring-loaded, radially movable brake shoes for braking on the housing of the additional eccentric during a reversal of direction of rotation, which shoes expand outward under the action of centrifugal force against the spring action in order to stop the braking.

In this way it is ensured that the additional eccentric is initially braked during a reversal of direction of rotation and that the braking is stopped again with increasing rotational speed.

A bearing sleeve, which the brake shoes contact during a reversal of direction of rotation, can be held on the housing, and wherein the brake shoes rest against an inside surface of the sleeve under the action of centrifugal force in order to thus fix the relative position between the eccentric and the additional eccentric.

In this way it is ensured that the brake shoes securely fix the relative position between the eccentric and the additional eccentric in operation so that the amplitude of the oscillation angle cannot change.

The brake shoes can be coupled to the additional eccentric by the driver pin, which extends through the slide guide of the sleeve into the driver receptacle.

In this way the driving of the additional eccentric is accomplished on the one hand, and at the same time the brake shoes are coupled to the additional eccentric on the other hand.

Furthermore, a system with an oscillation drive of the above-described type is provided by the invention, having a multiplicity of tools, wherein the tools have a coding, and wherein a control unit is provided for automatic setting of the oscillation angle.

In this way, when the oscillation drive is used with a multiplicity of tools, an automatic setting of the oscillation angle can be defined as a function of the tool being used. This achieves the result that the tool in question is always operated with the desired amplitude of the oscillation angle in order to thus achieve optimized use.

The control unit can also be designed for automatic setting of the oscillation angle and/or of the speed.

Consequently, the applicable tools can automatically be operated with the optimum oscillation angle and the associated optimum speed.

The coding can be implemented as, for example, an RFID chip here.

The drive can have an electronically commutated electric motor. In this design, the switchover of the direction of rotation can be accomplished automatically by the control unit. The speed can also be set automatically.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
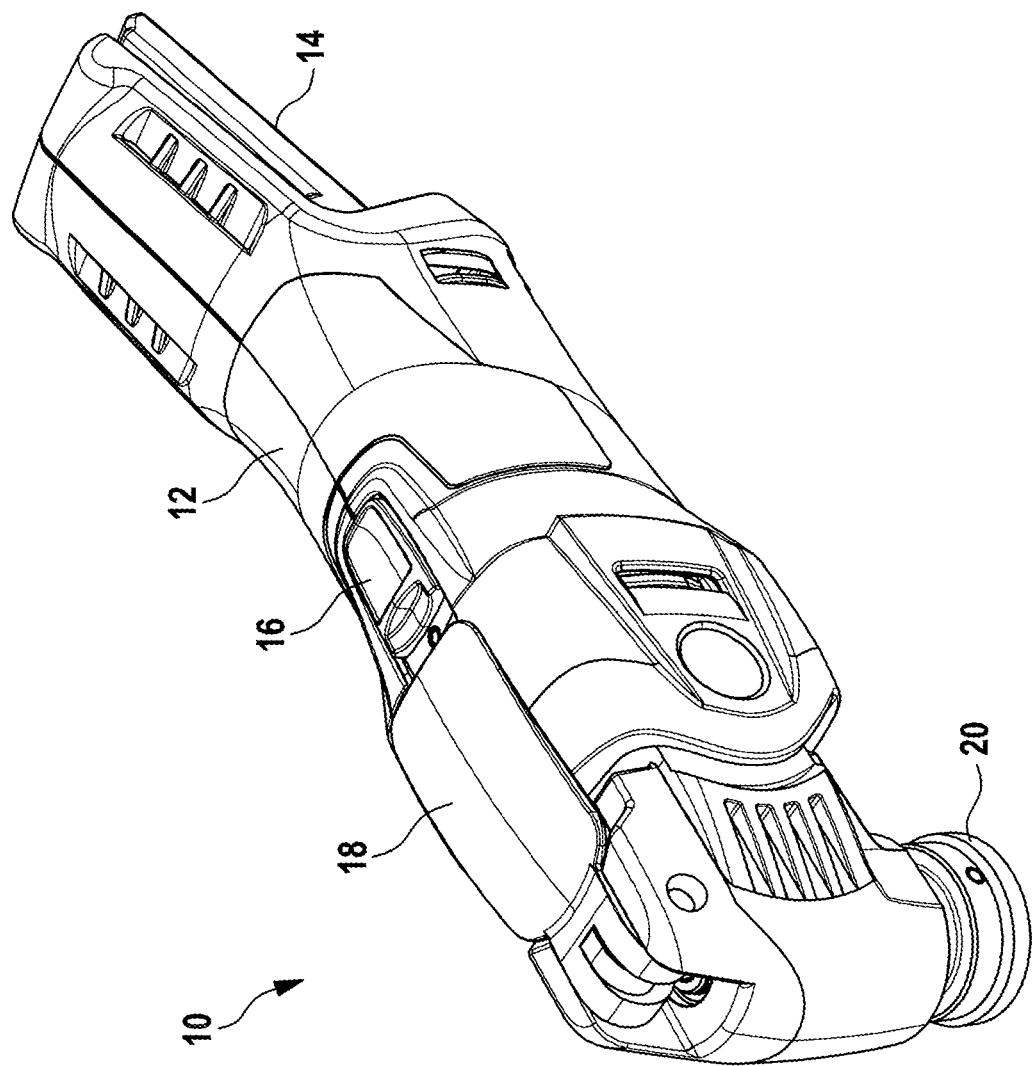
FIG. 1 is a perspective representation of an oscillation drive according to an exemplary embodiment of the invention.

In FIG. 1, an oscillation drive according to the invention is shown in a perspective view and is labeled overall with reference number 10. The oscillation drive 10 has a housing 12 that can be grasped by one hand, and on the back end of which is provided a receptacle 14 for a rechargeable battery. A tool spindle 20 projects downward at right angles from a front end of the housing 12. Various tools can be attached to the tool spindle 20 by means of a quick-action chuck, for which purpose a locking lever 18 is provided, which is visible on the top of the housing 12. Also visible on the top of the housing 12 is an on/off switch 16, which serves to switch the machine on and off. In addition, a switch is provided for reversing the direction of rotation; it is arranged on the right-hand side of the housing 12.

Figure 2:
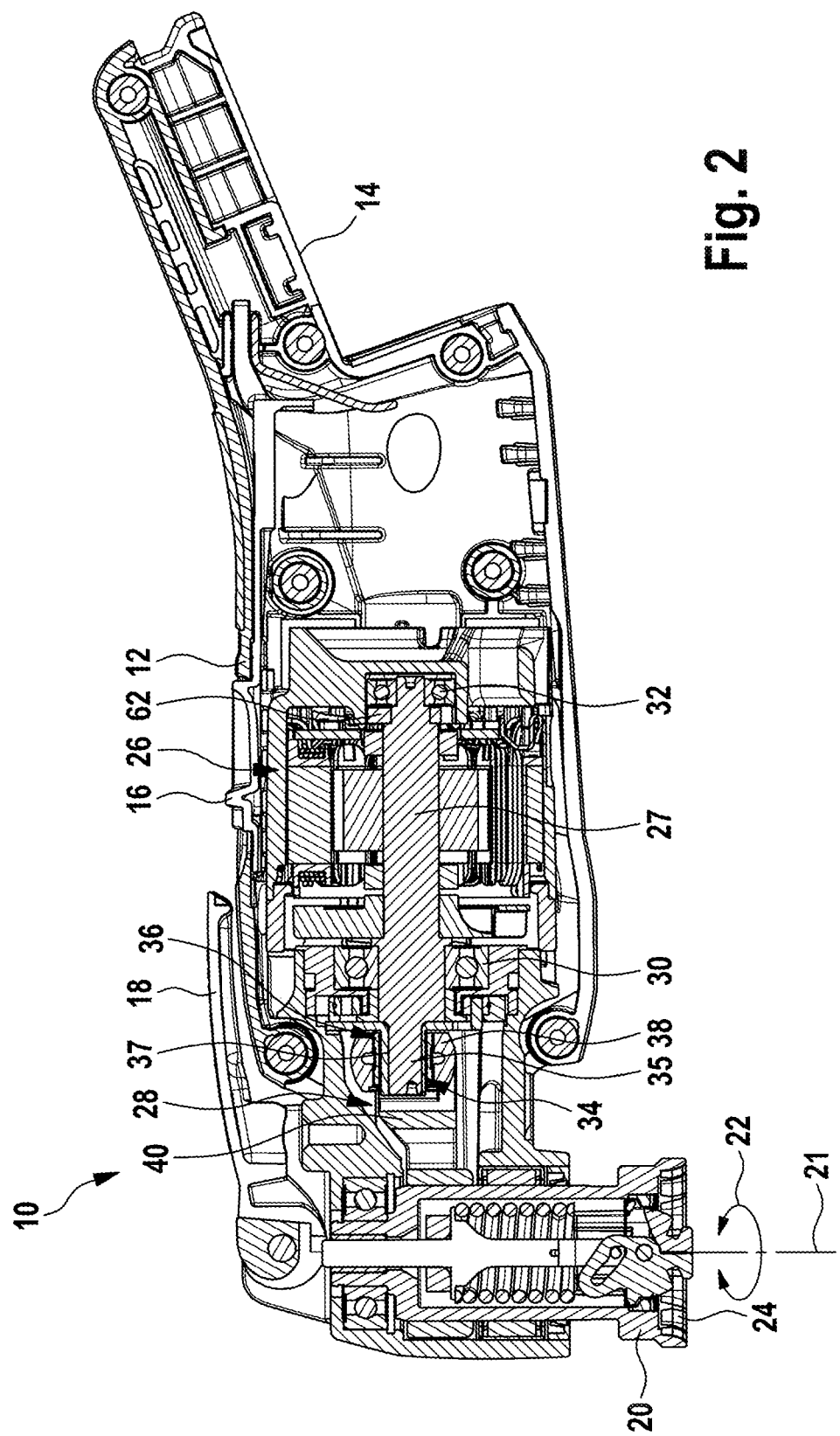
FIG. 2 is a longitudinal section through the oscillation drive from FIG. 1.

FIG. 2 shows a longitudinal section through the oscillation drive 10 from FIG. 1.

The oscillation drive 10 has a drive 26, which in the present case is designed as an electronically commutated electric motor (EC motor). This has a motor shaft 27, which is rotatably mounted by means of two bearings 30, 32. The rotary motion of the motor shaft 27 is converted into an oscillating rotary motion of the tool spindle 20 about its longitudinal axis 21 by means of an eccentric coupling drive, as is indicated by the double-headed arrow 22. Whereas in conventional eccentric coupling drives, an eccentric motion of an eccentric provided on the end of the motor shaft by means of a crowned eccentric bearing and a rocker arm that acts on the eccentric bearing and is rigidly coupled to the tool spindle, has another eccentric is additionally provided, the so-called additional eccentric, by which means it becomes possible to vary the amplitude of the oscillating motion.

Thus, in addition to an eccentric 34 with an eccentric stub 35 on the end of the motor shaft 27, an additional eccentric 36 is provided that is held directly on the eccentric stub 35 by a recess 37. The recess 37 is arranged eccentrically so that an eccentric motion is produced at the outer surface of the additional eccentric 36, which results from the superimposition of the two eccentricities of the eccentric 34 and the additional eccentric 36. Held on the outer surface of the additional eccentric 36 is an eccentric bearing 38 with a crowned outer ring, which is gripped on both sides by an oscillating fork 40 whose other end is rigidly connected to the tool spindle 20. The eccentric motion of the eccentric bearing 38 is consequently converted into an oscillating motion of the tool spindle 20.

The eccentricity with which the eccentric bearing 38, and hence the rocker arm 40, is moved depends on the relative position between the eccentric 34 and the additional eccentric 36. In the position shown in FIG. 2, the eccentricities of the eccentric 34 and the additional eccentric 36 are additive, resulting in a maximum amplitude of the oscillating motion. In contrast, if the additional eccentric 34 were rotated by 180° relative to the position in FIG. 2, then a subtractive superimposition of the two eccentricities would result, producing a minimum deflection due to the eccentric motion, and thus a minimum amplitude of the oscillating motion.

According to the invention, the switchover between these two relative positions that are rotated by 180° with respect to one another is accomplished by a reversal of the direction of rotation of the drive 26. The additional eccentric 36 remains stationary at startup until it is carried along by an associated stop of the eccentric 34. If the direction of rotation is reversed, then once again the additional eccentric 36 initially remains stationary before it is carried along in a position rotated by 180° by a stop of the eccentric 34.

The stopping of the additional eccentric 36 can take place simply by inertia, or else can be forced by a brake system.

The two variant embodiments are explained in detail below.

FIGS. 2 to 7 show the embodiment with a brake system, while FIGS. 8 to 11 show an embodiment without such a brake system, in which the stopping of the additional eccentric during a reversal of direction of rotation takes place through inertia alone.

Figure 3:
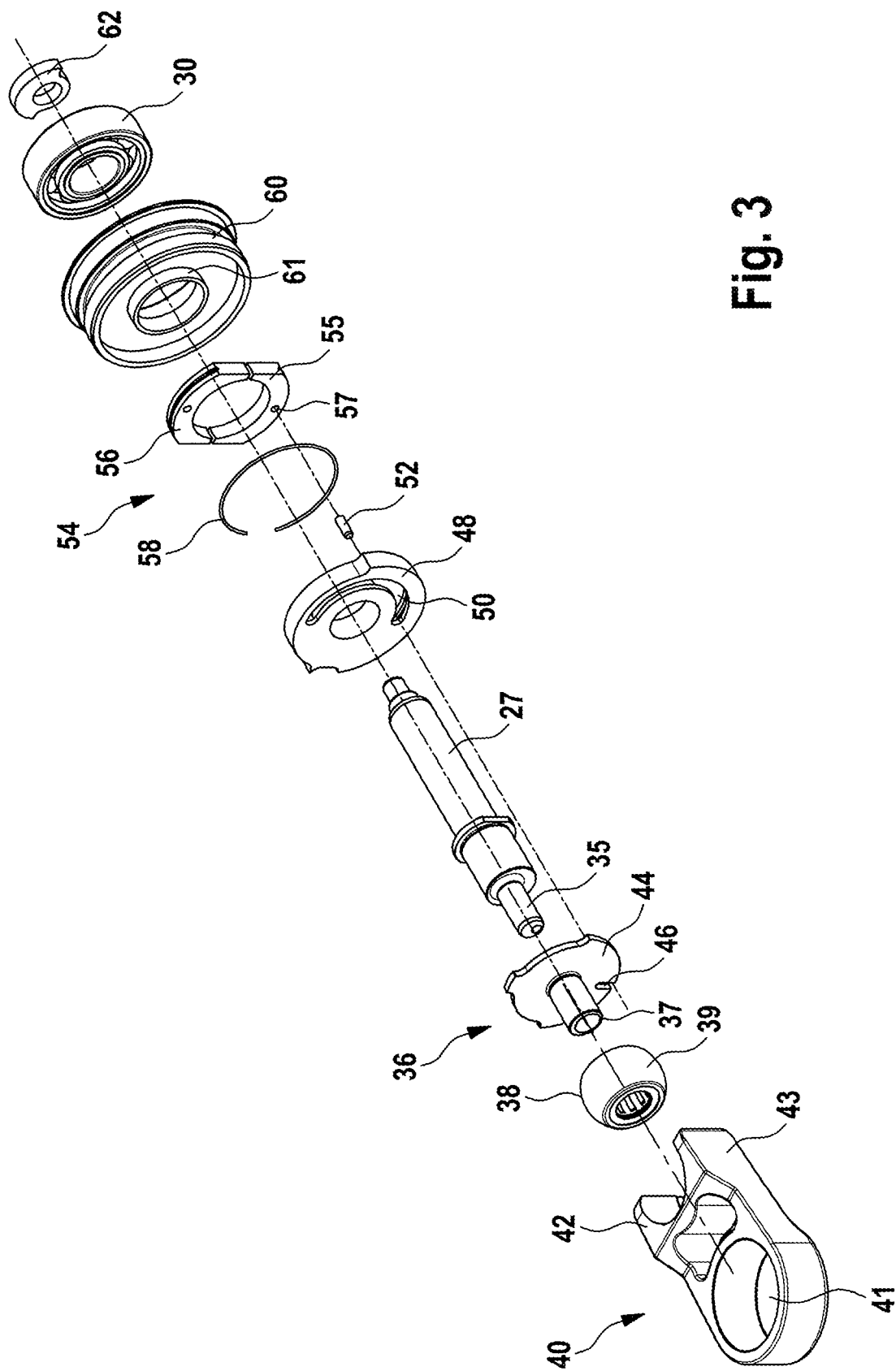
FIG. 3 is an exploded view of the essential parts of the drive train, which are shown with one another in the direction of installation along a longitudinal axis.

In FIG. 3, the essential moving parts of the embodiment with a brake system are shown in an exploded view, one behind the other in the installation position. Shown on the left-hand end is the rocker arm 40, which encloses the eccentric bearing 38 at its crowned outer ring 39 with two fork ends 42, 43. The rocker arm 40 is fixed in a rotationally fixed manner on the tool spindle 20 by means of a recess 41, for example by shrink fitting.

The eccentric stub 35 is formed on the motor shaft 27 at the outer end. The additional eccentric 36 is designed in the form of a sleeve, and has an eccentric recess 37 by which the additional eccentric 36 is held rotatably on the eccentric pin

35. Formed on the motor side of the additional eccentric 36 is a disk 44, in which a driver receptacle 46 is provided in the form of a radial groove 46.

Adjoining the disk 44 of the additional eccentric 37 is a sleeve 48, in which a slide guide 50 is provided in the form of a groove that extends over an angular range of 180°. Provided on the rear side of the sleeve 50 is a brake system 54 that is labeled overall as 54 and that has two brake shoes 55, 56 that can move radially with respect to one another and that are spring-loaded inward by means of a spring ring 58 surrounding the outside. One of the brake shoes 56, 57, namely the bottom brake shoe 57 in the illustration in FIG. 3, is rotationally coupled to the additional eccentric 36 by a driver pin 52, which extends through the slide guide 50, since the driver pin 52 engages the driver receptacle 46 of the disk 44.

The bearing 30 facing the tool spindle 20, which sits with its inner ring on the motor shaft 27, engages with its outer ring in a bearing sleeve 60 that is fixed in the housing 12. The bearing sleeve 60 has a projection 61 extending toward the tool spindle 20, on which the inner surfaces of the brake shoes 55, 56 can rest when they are pressed on by the spring ring 58.

Also visible in FIG. 3 is an associated counterweight 62, which is provided on the outer end of the motor spindle 27 (see also FIG. 2).

Figure 4:
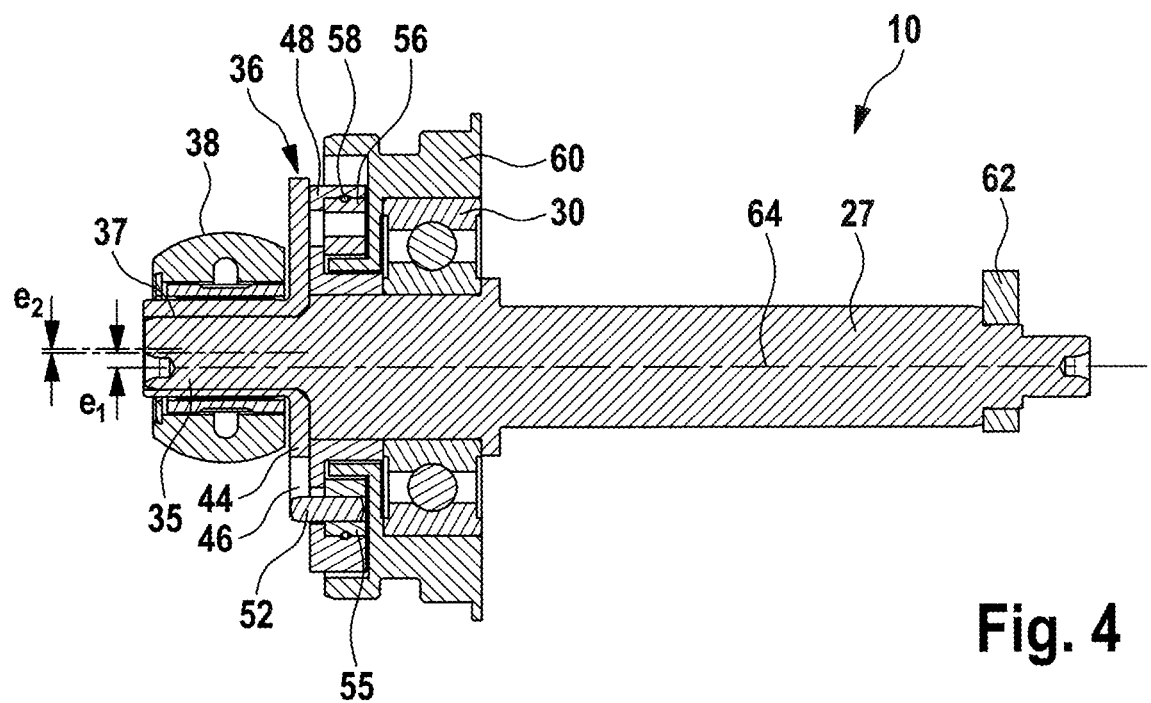
FIG. 4 is a longitudinal section through the motor shaft and associated parts in the region of the support with the eccentric and additional eccentric in a first relative position between the eccentric and the additional eccentric, in which the two eccentricities are superimposed additively.

In FIG. 4, the two eccentricities, which are produced by the eccentric 34 or the eccentric pin 35 and the additional eccentric 36, are indicated by e1 and e2. While the eccentric pin 35 has a relatively large eccentricity e1, the eccentricity e2 caused by the additional eccentric 36 is smaller than the first eccentricity e1.

Figure 5:
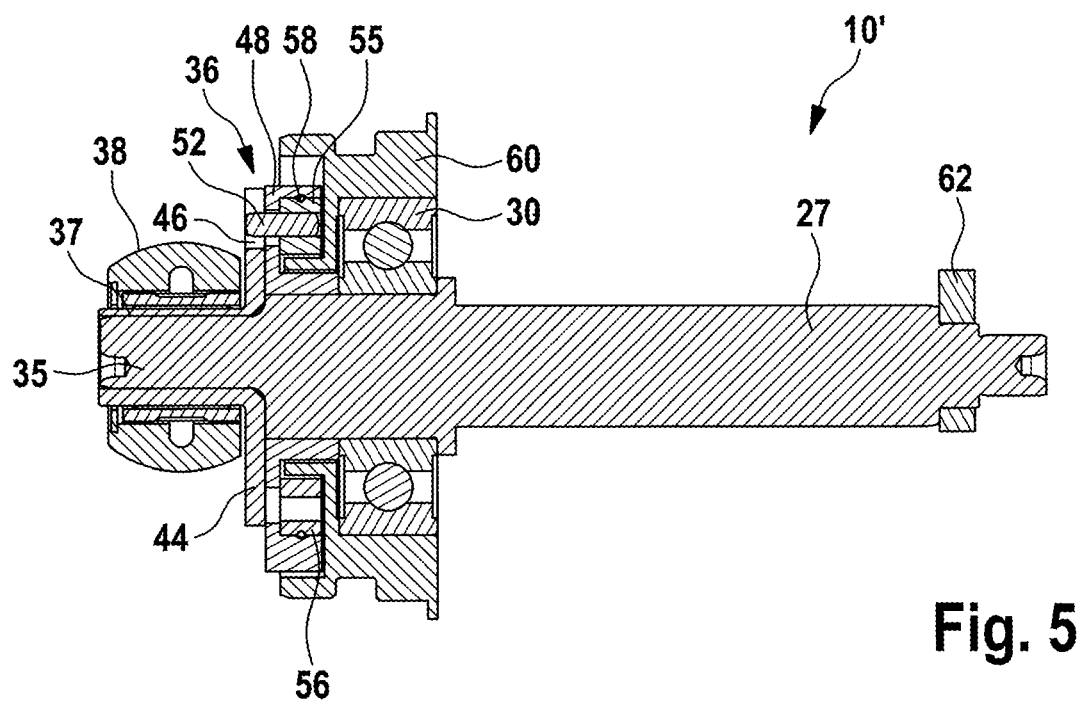
FIG. 5 is a representation as in FIG. 4, but wherein the eccentric and the additional eccentric have been moved into a position rotated by 180° relative to one another, in which the two eccentricities are superimposed subtractively.

In the position shown in FIG. 4, the relative position of the eccentric stub 35 and the additional eccentric 36 is such that the two eccentricities e1 and e2 are superimposed additively, so that the resulting total eccentricity is eg=e1+e2. If the eccentric and the additional eccentric are rotated by 180° with respect to one another as compared to the position from FIG. 4, then the position shown in FIG. 5 is produced, in which the two eccentricities e1 and e2 are superimposed subtractively, so that the resulting total eccentricity is eg=e1−e2.

Depending on the size of the eccentricities e1 and e2, different resulting eccentricities are produced, so that the amplitude of the oscillation angle can be adjusted within relatively wide limits. For example, a combination of 2.6°/5.0° (amplitude of the oscillation angle from dead center to dead center) can be used.

Figure 6:
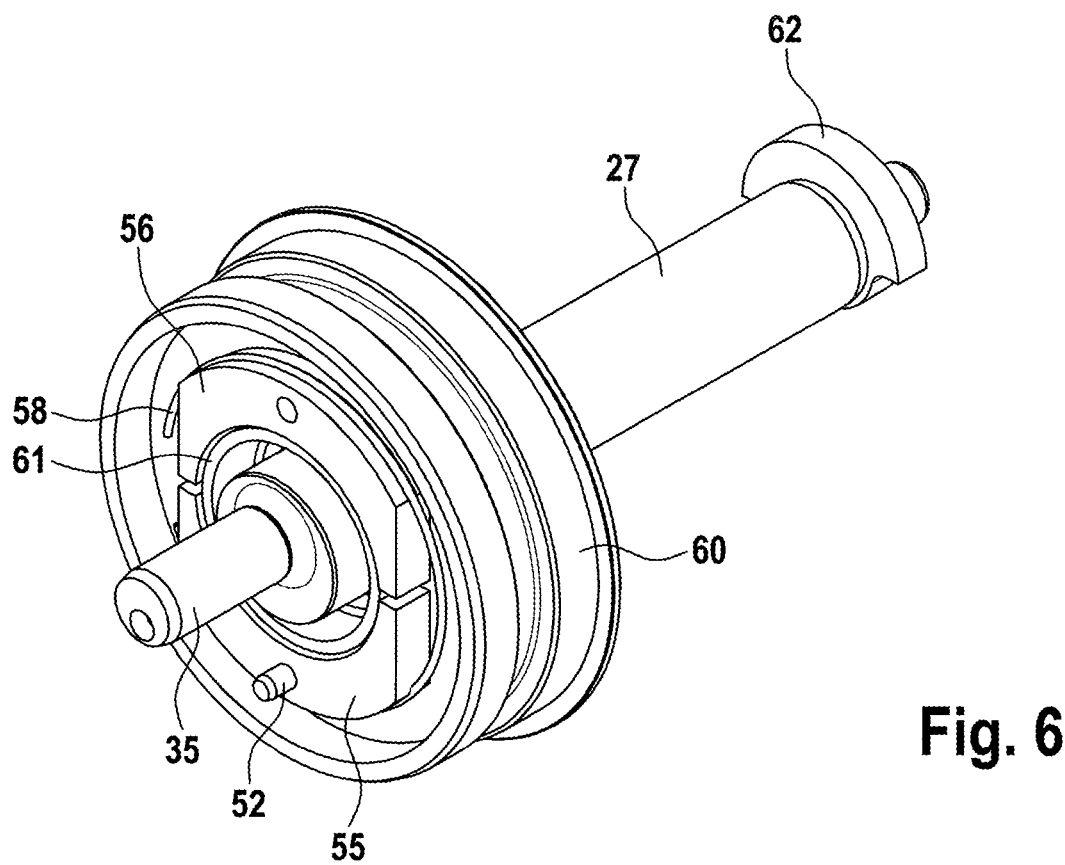
FIG. 6 is an enlarged perspective representation of the motor shaft in the region of the brake system, wherein a number of parts have been cut out for the purposes of improved clarity.
Figure 7:
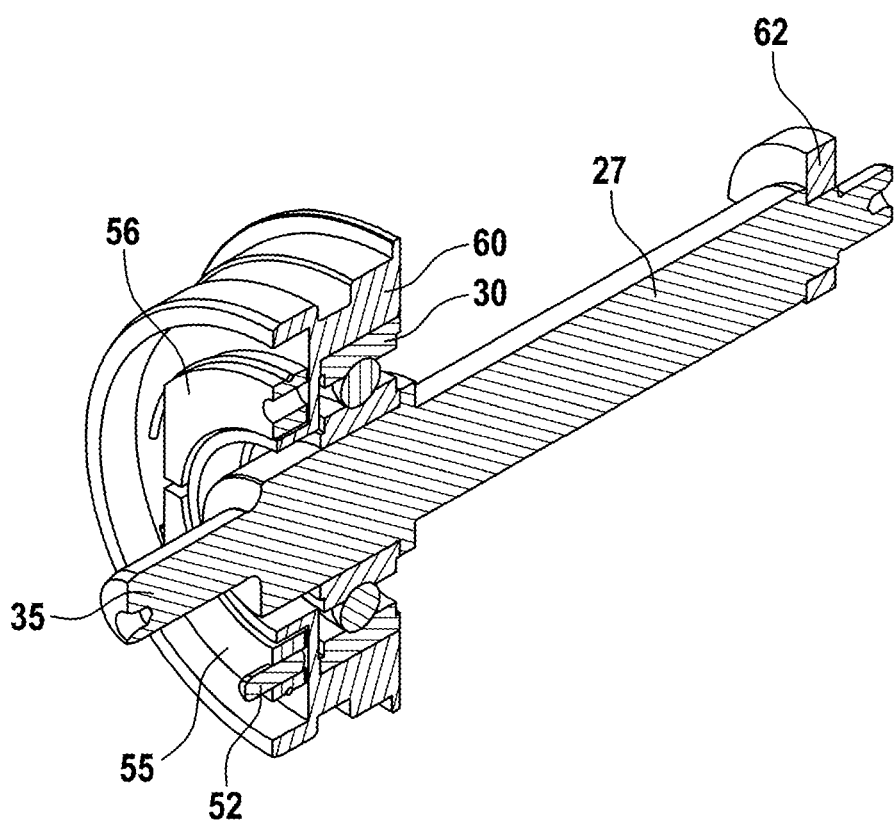
FIG. 7 is a representation as in FIG. 6, but wherein a longitudinal section passing through the central axis of the motor shaft has been provided.
Figure 8:
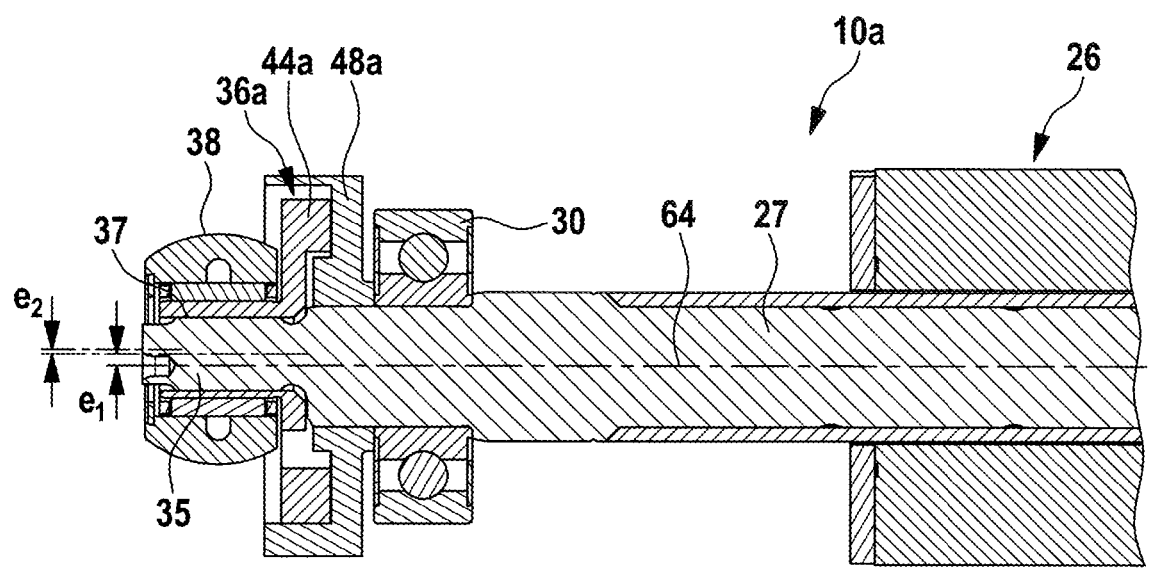
FIG. 8 is a modified implementation of the oscillation drive as in FIGS. 4 and 5 with a longitudinal section through the front part of the motor shaft, with associated support, eccentric, additional eccentric, and eccentric bearing in a first relative position between the eccentric and the additional eccentric, in which an additive superimposition of the two eccentricities is produced.
Figure 9:
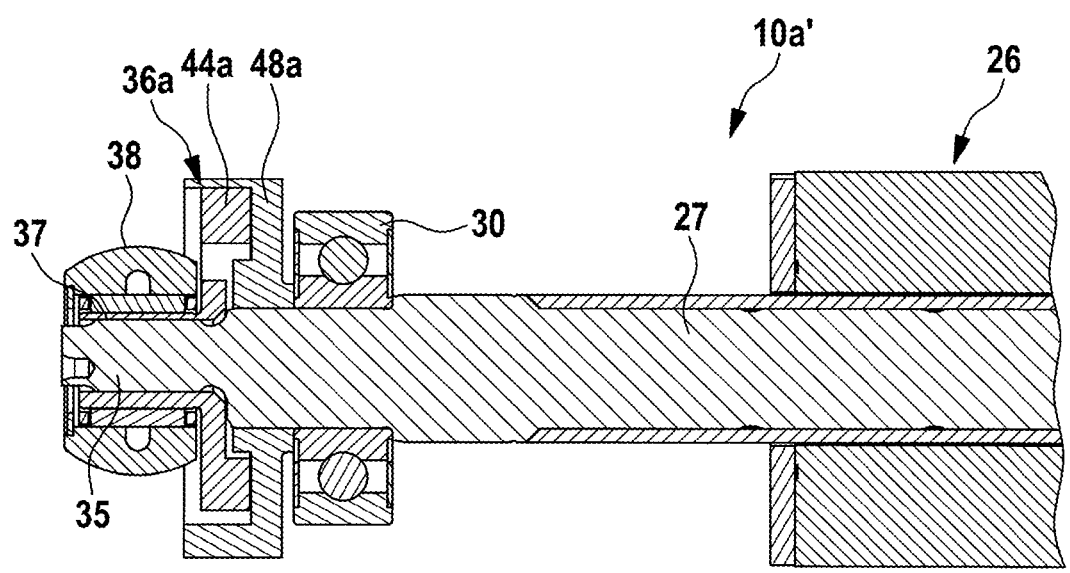
FIG. 9 is a representation as in FIG. 8, but wherein the eccentric and the additional eccentric have been rotated by 180° relative to one another so that a subtractive superimposition of the two eccentricities is produced.
Figure 10:
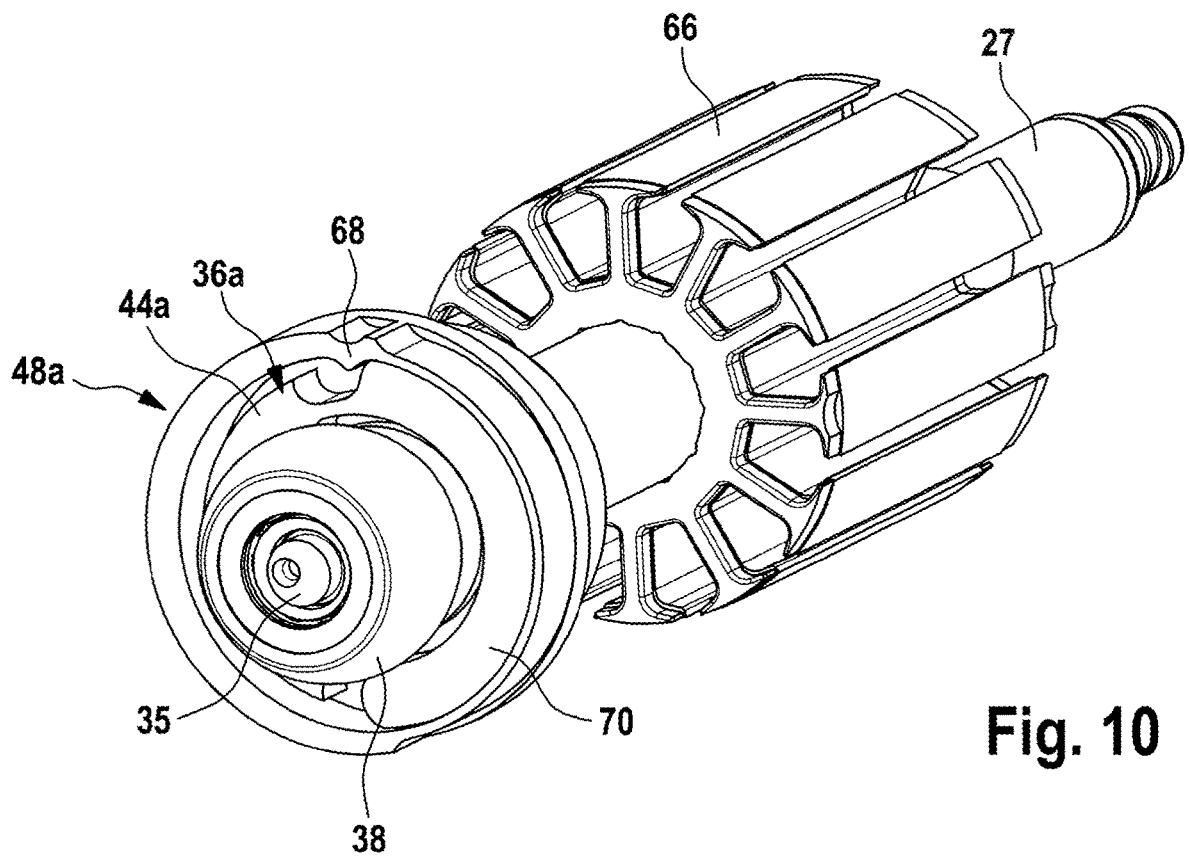
FIG. 10 is an enlarged perspective representation of the embodiment from FIGS. 8 and 9, wherein the motor shaft along with the rotor body located thereon, the sleeve between the eccentric and the additional eccentric, and the eccentric bearing are visible.
Figure 11:
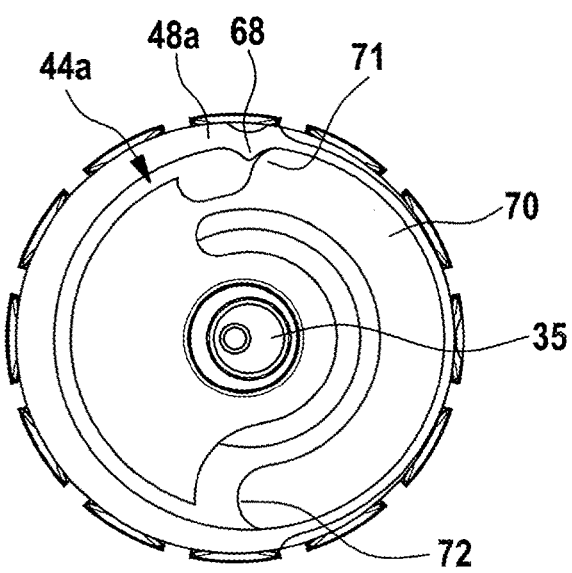
FIG. 11 is a front view of the arrangement from FIG. 10 after removal of the eccentric bearing.

As is evident in detail from FIGS. 6 and 7, the two brake shoes 55, 56 are held on the projection 61 of the bearing sleeve 60 by the surrounding spring ring 58 when at a standstill or during a reversal of direction of rotation. Thus, during the reversal of direction of rotation, the additional eccentric 36 is rotationally held in place or braked by the driver pin 52, which engages the driver receptacle 46. The sleeve 48 sits on the outer surface of the motor shaft 27 in a rotationally fixed manner. If the motor shaft 27 now moves in the opposite direction of rotation during a reversal of direction of rotation, then the eccentric stub 35, which is rigidly connected to the motor shaft 27, moves relative to the additional eccentric 36 until the driver pin 52 strikes the other end of the slide guide 50, and the additional eccentric 36 is now carried along. With increasing speed the brake shoes 55, 56 move outward until they come to rest against an inside surface of the sleeve 48, so that the braking is released on the one hand and the relative position between the eccentric 34 and the additional eccentric 36 is fixed on the other hand.

During a reversal of direction of rotation, the motor shaft 27 is first stopped, so that the additional eccentric 36 is again braked by means of the brake system 24 until finally the driver pin 52 comes to rest against the opposite end of the slide guide 50 and again carries the additional eccentric 36 along.

FIGS. 8 to 11 show a simplified embodiment of the oscillation drive with no brake system, which is labeled overall as 10a. Correspondingly modified parts are labeled with corresponding reference symbols that are followed by the letter "a" while the other corresponding parts are labeled with corresponding reference symbols (in FIGS. 10 and 11, the rotor body 66 of the motor is also visible in addition).

The sleeve-shaped additional eccentric 36a has a disk 44a (see, in particular, FIG. 8, 9, 11), one half of which is designed as an elastic section 70. The disk 44a is movable within the enclosing sleeve 48a, and has two ends 71, 72 on the elastic section 70 that can come to rest against one side or the other side of a projecting lug 68 of the sleeve 48a depending on the direction of rotation. Thus, depending on whether the additional eccentric 36a, and thus the disk 44a, is rotated clockwise or counterclockwise, one end 71 or the other end 72 of the elastic section 70 comes to rest against the lug 68, and is carried along as a result. With increasing speed, the elastic section 70 expands outward and comes to rest against the associated inner surface of the sleeve 48a so that the relative position between the eccentric 34 and the additional eccentric 36a, and thus the amplitude of the oscillating motion, is fixed.

As already mentioned at the outset, different amplitudes of the oscillating motion are especially advantageous for different tools. The idea thus suggests itself of providing the applicable tools with suitable coding that can be read out automatically in order to accomplish automatic switchover of the amplitude of the oscillation angle.

Figure 12:
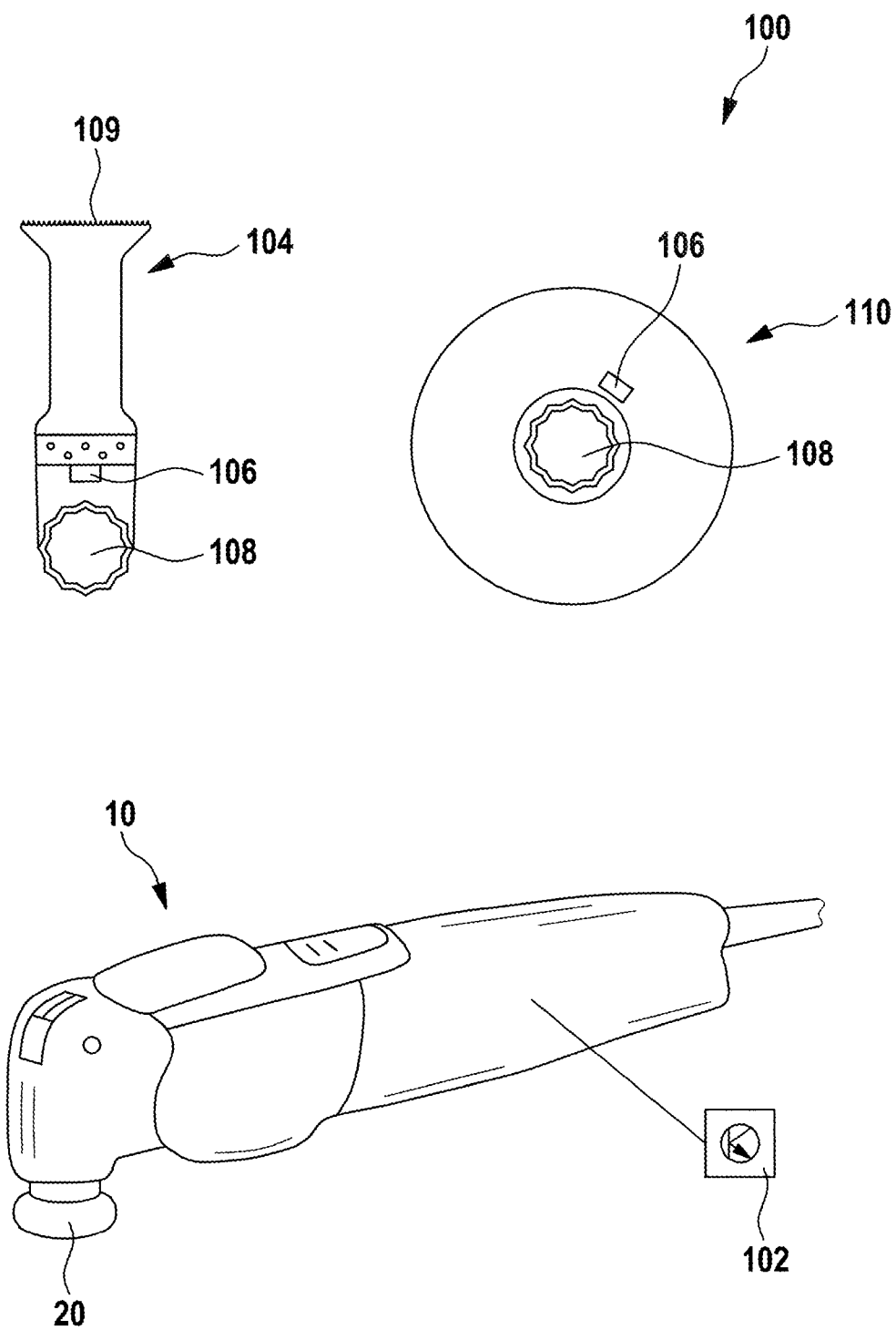
FIG. 12 is a system with an oscillation drive as in FIG. 1 and with two associated tools.

By way of example, FIG. 12 shows a system 100 with an oscillation drive 10 of the above-described type and with two tools 104 and 110 shown by way of example.

The tool 104 is an elongated sawing tool with a cutting edge 109 on the outer edge. Provided for attachment is a mounting opening 108, with which interlocking mounting on the tool spindle 20 is made possible.

To ensure automatic detection of the tool 104, an RFID chip is provided that is indicated schematically with 106.

The oscillation drive 10 has control electronics that are merely indicated schematically with 102, and which automatically read out the RFID chip 106 and then automatically set an associated amplitude of the oscillation angle for it. The EC motor of the oscillation drive 10 is automatically operated by the control unit 102 with the associated direction of rotation that produces the desired oscillation angle.

The second tool 110 shown by way of example is an abrasive tool with a relatively large backing pad that again is equipped with an RFID chip 106. Due to the relatively large inertia of the abrasive tool, this tool should normally be operated with a smaller amplitude of the oscillation angle. This setting to the smaller amplitude is again accomplished automatically by the control unit 102.

In addition to an automatic setting of the amplitude of the oscillation angle, different speeds can also be stored so that the applicable tools can be used with an optimal combination of oscillation angle and speed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An oscillation drive comprising:
    a drive; and
    an eccentric coupling drive for converting a rotary motion of the drive into an oscillating rotary motion of a tool spindle about a longitudinal axis,
    wherein the eccentric coupling drive has a first eccentric with a first eccentricity that is driven by the drive and that works together with a coupling element that is coupled to the tool spindle to convert a motion of the eccentric into an oscillating rotary motion of the tool spindle, and
    wherein the first eccentric is coupled to an additional eccentric with a second eccentricity so that eccentricities are superimposed, wherein a relative position between the first eccentric and the additional eccentric is adjustable to at least two different positions in order to change an amplitude of the oscillating motion of the tool spindle.

2. The oscillation drive according to claim 1, wherein the drive is reversible in its direction of rotation in order to cause a switchover between a first relative position of the first eccentric and the additional eccentric in which the two eccentricities are superimposed additively, and a second relative position in which the eccentricities of the first eccentric and the additional eccentric are superimposed subtractively.

3. The oscillation drive according to claim 2, wherein the first eccentric and the additional eccentric are rotatable by 180° relative to one another between the first and second relative positions.

4. The oscillation drive according to claim 1, wherein the coupling element is an oscillating fork, which is rigidly attached at a first end to the tool spindle and is driven at a second end by the additional eccentric.

5. The oscillation drive according to claim 4, wherein the additional eccentric is rotatably mounted on the first eccentric, and wherein the second end of the oscillating fork encloses, an eccentric bearing that is held on the additional eccentric.

6. The oscillation drive according to claim 4, wherein the eccentric bearing is a spindle bearing with a crowned outer ring that is enclosed by two fork ends of the oscillating fork.

7. The oscillation drive according to claim 1, wherein the first eccentric has an eccentric stub that engages an eccentrically located recess of the additional eccentric, the eccentric bearing being held on an outer surface of the additional eccentric.

8. The oscillation drive according to claim 7, wherein the eccentric stub is implemented at one end of an output shaft of the drive that is driven in rotation.

9. The oscillation drive according to claim 8, wherein the drive has an electric motor with a motor shaft connected to the eccentric stub.

10. The oscillation drive according to claim 9, wherein a sleeve, which is adapted to be coupled to the additional eccentric in at least two relative positions by means of a driver, is arranged on the motor shaft in a rotationally fixed manner.

11. The oscillation drive according to claim 10, wherein the additional eccentric has a disk that is rotatably arranged inside the sleeve and strikes against a lug of the sleeve in the at least two relative positions.

12. The oscillation drive according to claim 11, wherein the disk has an elastic section that expands outward under the action of centrifugal force and rests against an inside surface of the sleeve to fix the relative position between the first eccentric and the additional eccentric.

13. The oscillation drive according to claim 10, wherein a brake system is provided that permits braking of the motor shaft in the stationary condition relative to a housing and that releases under the action of centrifugal force when the motor shaft is rotating in order to end the braking action.

14. The oscillation drive according to claim 13, wherein the sleeve has a slide guide in the form of a recess, through which a driver pin in an associated driver receptacle on the additional eccentric engages, in order to define the relative position between the first eccentric and the additional eccentric.

15. The oscillation drive according to claim 14, wherein the brake system has two spring-loaded, radially movable brake shoes for braking on the housing of the additional eccentric during a reversal of direction of rotation, which shoes expand outward under the action of centrifugal force against the spring action in order to stop the braking.

16. The oscillation drive according to claim 15, wherein a bearing sleeve, which the brake shoes contact during a reversal of direction of rotation, is held on the housing, and wherein the brake shoes rest against an inside surface of the sleeve under the action of centrifugal force in order to thus fix the relative position between the first eccentric and the additional eccentric.

17. The oscillation drive according to claim 15, wherein the brake shoes are coupled to the additional eccentric by the driver pin, which extends through the slide guide of the sleeve into the driver receptacle.

18. A system comprising:
    an oscillation drive according to claim 1;
    a plurality of tools, wherein the tools have a coding; and
    a control unit adapted to automatically set an oscillation angle.

19. The system according to claim 18, wherein the control unit automatically sets the oscillation angle and/or the speed.

20. The system according to claim 18, wherein the coding is an RFID chip.

21. The system according to claim 18, wherein the drive has an electronically commutated electric motor.

* * * * *